United States Patent Office 3,401,785
Patented Sept. 17, 1968

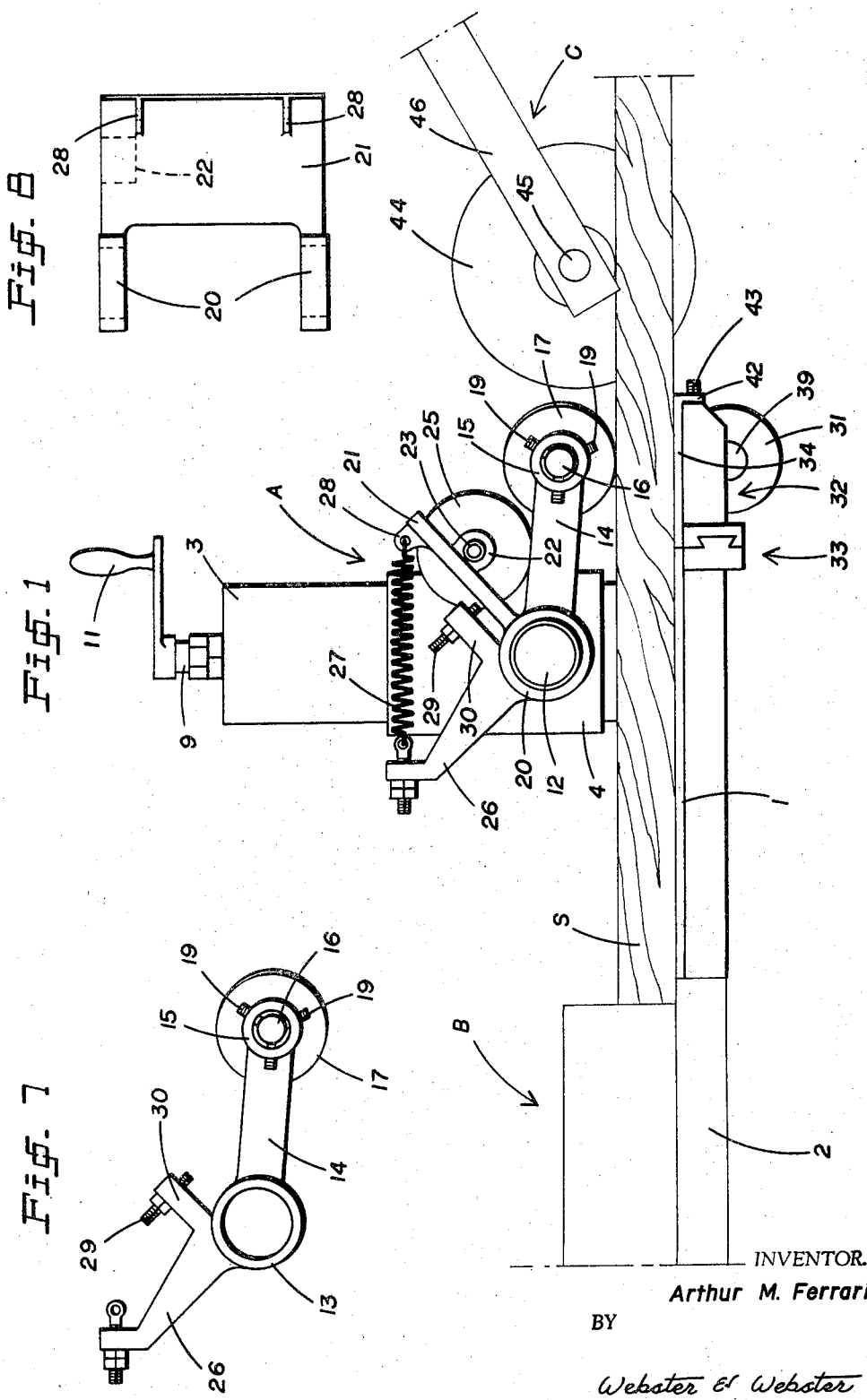

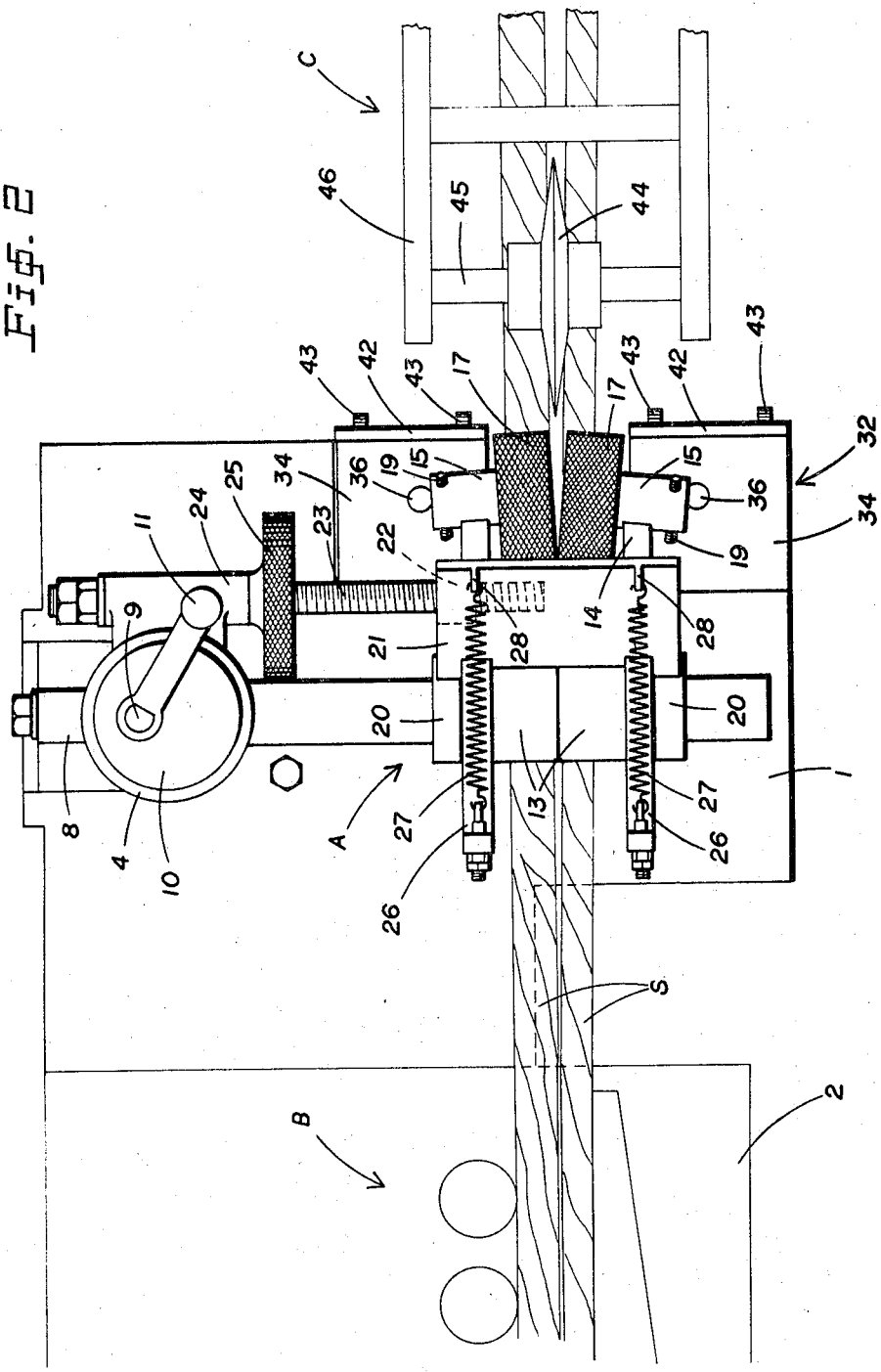

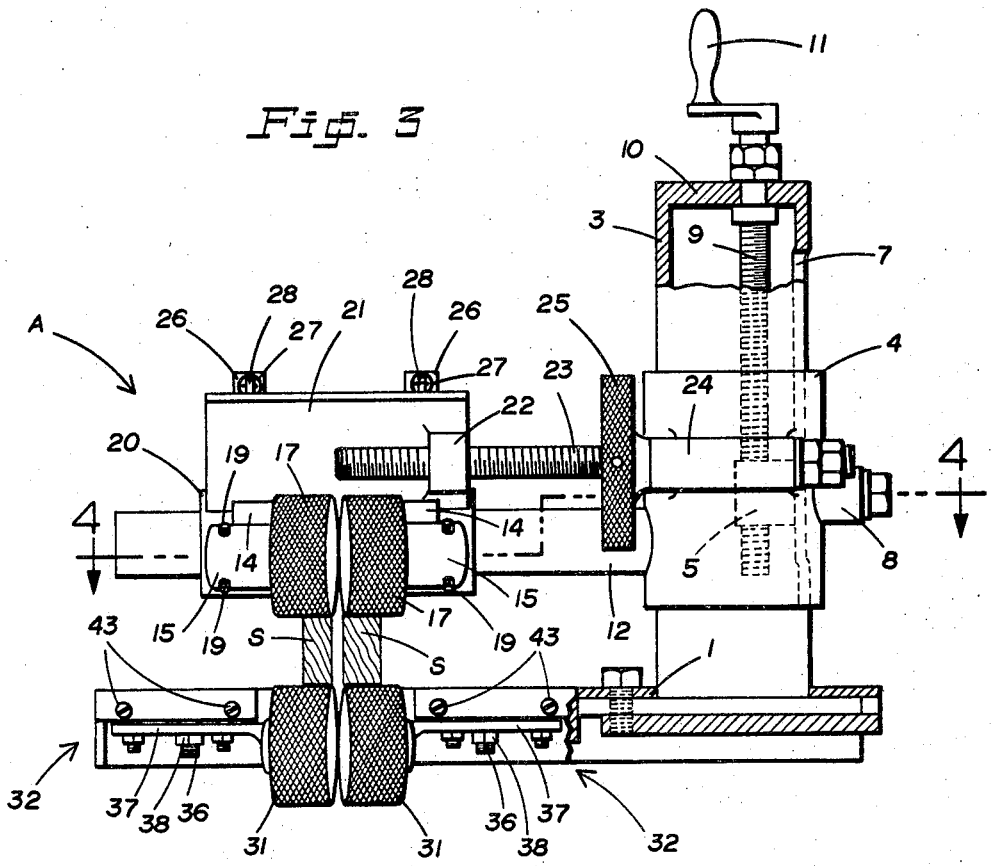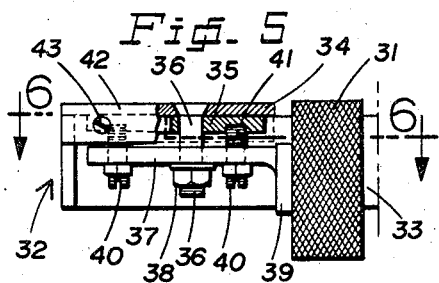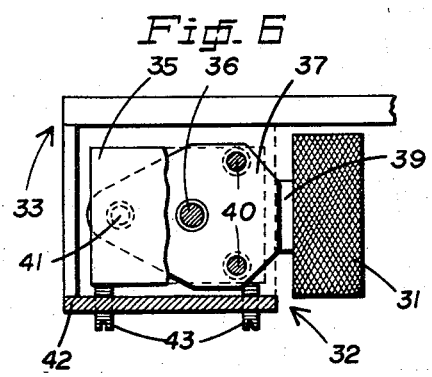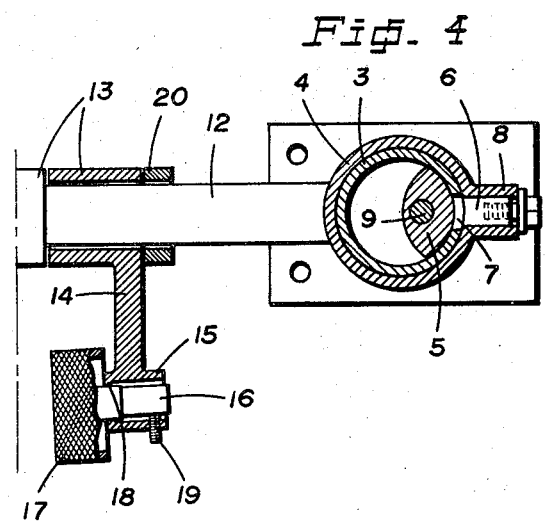

3,401,785
SEPARATOR UNIT FOR LUMBER STRIPS
Arthur M. Ferrari, P.O. Box 315,
Corning, Calif. 96021
Filed Jan. 30, 1967, Ser No. 612,413
5 Claims. (Cl. 198—34)

ABSTRACT OF THE DISCLOSURE

A separator unit for lumber strips being advanced while in side-by-side contact with each other, the unit comprising support for the strips as advanced, rollers mounted in connection with the support to engage the upper faces of the advancing strips and arranged to exert lateral force thereon to cause said strips to spread apart in forwardly diverging relation to each other.

Background of the invention

Heretofore, the lumber strips as fed from a saw in side-by-side contact have—to a great extent—been manually grasped and laterally separated for stacking. This method of handling is not only tedious but also high in labor cost. Various previous attempts to accomplish the result mechanically have not been wholly successful.

Summary of the invention

The present invention provides, as a major object, a novel separator unit which is operative—automatically—to effectively and positively laterally separate lumber strips as they advance from a saw in initially side-by-side contact; the separator unit being especially advantageous when used with and delivering to an automatic stacking machine or off-bearer loader such as shown in copending United States patent application Serial No. 645,047, filed June 9, 1967.

The present invention provides, as another object, a separator unit—for the purpose described—which is readily adjustable to accommodate lumber strips of varying dimensions and to properly cooperate therewith in the position thereof as received from the saw.

The present invention provides, as still another object, a separator unit—as above—which includes transversely spaced rollers mounted to yieldably but forcefully press down on the lumber strips passing thereunder; the rollers being operative, by reason of certain angular setting thereof, to cause the engaged and advancing lumber strips to be laterally spread apart or separated.

The present invention provides, as an additional object and in connection with the rollers, novel means to adjust said rollers as a unit, both laterally and vertically, as the height of the lumber strips or the lateral position of the saw cut may necessitate for the best results. Also, the rollers may be independently adjusted to alter the angular setting of the rollers relative to each other and to the advancing lumber strips, and which angularity affects the angle of spread of said strips.

The present invention provides, as a further object, a separator unit for lumber strips which is designed for ease and economy of manufacture.

The present invention provides, as a still further object, a practical, reliable, and durable separator unit for lumber strips and one which is exceedingly effective for the purpose for which it is designed.

Brief description of the drawings

FIG. 1 is a side elevation of the separator unit as in operation.
FIG. 2 is a plan view of the separator unit.
FIG. 3 is a front elevation of the separator unit.
FIG. 4 is a fragmentary sectional plan taken substantially on line 4—4 of FIG. 3.
FIG. 5 is an enlarged front elevation, partly in section, of the mount for one of the lower rollers.
FIG. 6 is a sectional plan of such mount, taken substantially on line 6—6 of FIG. 5.
FIG. 7 is a side elevation of the mount for one of the upper rollers, detached.
FIG. 8 is a plan view of the movement-controlling member for the upper rollers, detached.

Description of the preferred embodiment

Referring now more particularly to the drawings and to the characters of reference marked thereon, the separator unit—which is the subject of this invention and indicated generally at A—is disposed between and in alinement with the saw (not shown) and its lumber strip guide unit indicated generally at B, and an automatic stacking machine or off-bearer loader indicated in a fragmentary part of C; the separator unit A delivering to said machine C.

The separator unit A comprises a horizontal platform 1 fixed to and on a level with the table 2 of the unit B and projecting forwardly therefrom. Removably mounted on and upstanding from the platform 1 intermediate its ends and well to one side of the path of movement of the lumber strips S advancing along said platform from the saw and its guide unit B, is a hallow post 3. A sleeve 4 is slidable on the post 3, while a block 5 is slidable in the post at a level intermediate the top and bottom of the sleeve. A pin 6, rigid with the block 5 projects through a vertical guide slot 7 in the laterally outermost side of the post; said pin being rigidly supported in a mounting boss 8 provided therefor in the side of the sleeve 4. In this manner, the sleeve 4 and block 5 are connected together as a rigid unit, and the sleeve—while free to move vertically on the post—cannot rotate thereon. When desired, vertical movement is imparted to the sleeve by means of a screw rod 9 threaded through the block 5 and turnably mounted in the top 10 of the post 3; said rod 9 above the post being provided with a crank handle 11.

Rigid with and projecting laterally inward from the sleeve 4, preferably near the lower edge thereof, is a transverse horizontal shaft 12. Turnable and slidable on the shaft 12 are substantially abutting but independent hubs 13 from each of which a radial arm 14 projects forwardly, and a short transverse sleeve 15 is fixed on the forward end of each arm 14; said sleeves 15 being disposed with their axes forwardly converging at a slight angle as shown in FIG. 2. Mounted in the transverse sleeves 15 are the hub axles 16 of a pair of upper, side-by-side rollers 17 which are turnably mounted on the adjacent ends of said axles. Because of the angle of the sleeves 15, the upper rollers 17 are disposed in forwardly diverging relation as shown in FIGS. 2 and 3. The faces of the rollers 17, which are preferably knurled as indicated, and which in operation are engaged on the separate and corresponding lumber strips S passing thereunder, are of substantial width in order to provide adequate frictional contact with such strips S.

Each stub axle 16 has a clearance fit in its sleeve 15 except at the end thereof nearest the corresponding roller 17. At such end, the bore of the sleeve 15 is formed with a small bead-like axle-engaging circumferential rib 18 (see FIG. 4) about which the axle 16, and its roller 17, may be swivelly adjusted. The extent of such swivel adjustment, which determines the angular position of the roller 17 relative to the lumber strip S engaged thereby, is controlled by means of a number of radial, circumferentially spaced screws 19 threaded through the sleeve 15 adjacent the end thereof opposite the rib 18, and engaging the axle 16 in independently adjustable relation.

The hubs 13 on shaft 12 are maintained substantially in contact with each other at all times by confining said hubs between shaft-engaged rings 20 which are rigidly connected as a unit by a radial plate 21 projecting from the rings at a forward and upward angle above and clear of the arms 14, as shown in FIG. 1. At the side adjacent sleeve 4, the plate 21 is provided with a tapped boss 22 through which a horizontal screw rod 23 is threaded; said rod 23 projecting transversely toward said sleeve 4 and at the forward side thereof being turnably supported against longitudinal movement in a short bearing tube 24 secured to the sleeve 4. A hand knob 25, by means of which the screw rod 23 may be turned, is mounted on said rod at the laterally inner end of the bearing tube 24. By reason of this arrangement, the lateral position of the upper rollers 17 relative to the platform 1 may be readily altered as may be necessary, yet with said rollers always remaining in the same positions relative to each other. Also, since the rollers 17, as well as the above described lateral adjustment means therefor, are all supported from the vertically movable sleeve 4, the vertical position of said rollers 17 relative to the platform 1 may be varied at any time without affecting the operation of the screw rod 23.

In order to cause each roller 17 to exert a forceful downward pressure on the lumber strip S engaged thereby, the corresponding hub 13 is formed with another arm 26 extending at a rearward and upward angle and in generally opposed relation to the corresponding arm 14. A tension spring 27 is adjustably connected at one end to the upper end of each arm 26, and at the other end to an ear 28 on and projecting from the rear face of the plate 21. Downward movement of the related roller 17 due to the spring action is limited by an adjustable stop pin 29 mounted in a lug 30 rigid with the arm 26 at the base thereof and projecting upwardly back of and substantially parallel to the plate 21 as shown in FIG. 1.

Another pair of rollers 31 corresponding in size and angularity to the rollers 17 is disposed directly under the latter; the rollers 31 supporting the lumber strips S engaged from above by said rollers 17. Such lower rollers 31 are each provided with a mount indicated generally at 32; said mounts being fixed in connection with transverse ways 33 (see FIG. 1) supported from the platform 1. Such ways 33 permit of transverse adjustment of the mounts 32, together with the lower rollers 31 carried thereby, without disturbing the angular position of said rollers relative to each other.

Each mount 32 comprises—at the top—a platform section 34 level with the platform 1, and under and contacting which platform section is a base plate 35; said base plate being arranged for limited rotative movement about a depending pivot bolt 36 supported from the platform section 34, as shown in FIG. 5. Below and spaced somewhat from the base plate 35 is another plate 37 through which the bolt 36 projects with a loose fit as shown. The bolt 36, below the plate 37, is provided with an adjustable nut 38. The plate 37—at one end—carries a spindle 39 on which the related lower roller 31 is mounted.

Threaded vertically through the plate 37 in spaced relation to each other and about the bolt 36 are adjustable screws 40 which—at their upper ends—engage in sockets 41 in the base plate 35. Adjustment of the screws 40 (which can be effected when the nut 38 is loosened) will of course, alter the tilted position of the plate 37 relative to a horizontal plane, and consequently the angularity of the related lower roller 31 relative to a vertical plane. A transverse bar 42 depends from the front edge of the platform section 34, and which bar forms the support for transversely spaced adjustable screws 43 which engage the base plate 35 on opposite sides of the axial plane of the pivot bolt 36, so that said plate—as well as the plate 37 which is connected thereto by the screws 40—may be swung about the bolt 36 as an axis. By so doing, the angularity of the related lower roller 31 relative to the longitudinal plane of the apparatus and to the lumber strip S engaged by said roller, may be changed as necessary for any particular condition of operation.

In operation, the above described separator unit for lumber strips functions in the following manner:

As the lumber strips S advance from the guide unit B of the saw and forcefully move forward over the platform 1, such lumber strips are firmly engaged between the corresponding upper roller 17 and lower roller 31. With continued forward travel of the lumber strips, the rollers—because of their forwardly diverging relation and the frictional contact had with the lumber strips—subject the lumber strips each to a laterally outward force which deflects such strips (which are somewhat flexible) and effectively spreads them apart. As so spread apart, the lumber strips deliver to an automatic stacking machine or off-bearer loader indicated in fragmentary part at C.

Preferably, the spread of the lumber strips is maintained—as they so deliver—by a horizontal axis taper roller 44 turnably and slidably mounted on a transverse spindle 45 which is supported in arms 46; the latter being elements of said stacking machine or off-bearer loader C.

As will be apparent, the adjustable mounting structures for rollers 17 and 31 enable them to be set to selected angles of divergence, to be shifted laterally, and—in the case of the upper rollers 17—to be moved vertically; all as the lateral position of the saw cut and the size or dimensions of the lumber trip may require.

From the foregoing description, it will be readily seen that there has been produced such a separator unit for lumber strips as substantially fulfills the objects of the invention, as set forth herein.

While this specification sets forth in detail the present and preferred construction of the separator unit for lumber strips, still in practice such deviations from such detail may be resorted to as do not form a departure from the spirit of the invention, as defined by the appended claims.

I claim:

1. A separator unit for lumber strips being advanced while in initial side-by-side contact with each other, the unit comprising a support for the strips as advanced, rollers mounted in connection with the support to engage the upper faces of the advancing strips and arranged to exert lateral force thereon to cause said strips to spread apart in forwardly diverging relation to each other and roller mounting means comprising a rigid transverse shaft rearwardly of the rollers, an arm on which each roller is mounted, the arms projecting rearwardly of the rollers, and a hub on the rear end of each arm turnable and slidable on the shaft; there being manually controlled means to adjust the hubs simultaneously along the shaft.

2. A separator unit, as in claim 1, in which the hubs are independent of each other but substantially abut on the shaft, and said control means comprises rings slidable on the shaft and abutting against the outer ends of the hubs, a rigid member connecting the rings, and means applied to the member to move the same lengthwise of the shaft.

3. A separator unit, as in claim 2, in which the last named means comprises, with a vertically movable member from which the shaft projects, a manually rotatable screw rod parallel to the shaft, a tapped boss in the rigid member through which the rod is threaded, and means rotatably mounting the rod on said vertically movable member against longitudinal movement.

4. A separator unit, as in claim 1, with mounting means for the shaft at one end thereof comprising a post upstanding from the support to one side of the rollers, a sleeve slidable on the post from which the shaft projects, and means to adjust the sleeve vertically on the post.

5. A separator unit, as in claim 4, with means connected between the sleeve and rollers to adjust the latter simultaneously along the shaft.

References Cited

UNITED STATES PATENTS

| | | | |
|---|---|---|---|
| 3,010,565 | 11/1961 | Pasinski | 198—67 |
| 3,088,359 | 5/1963 | Schur | 198—34 |
| 3,176,822 | 4/1965 | Schikofsky | 198—67 X |
| 2,816,646 | 12/1957 | Stocking | 198—31 |
| 3,191,929 | 6/1965 | Zernov et al. | 271—71 |

FOREIGN PATENTS 977,449  12/1964  Great Britain.

EVON C. BLUNK, *Primary Examiner.*

R. J. HICKEY, *Assistant Examiner.*